UNITED STATES PATENT OFFICE.

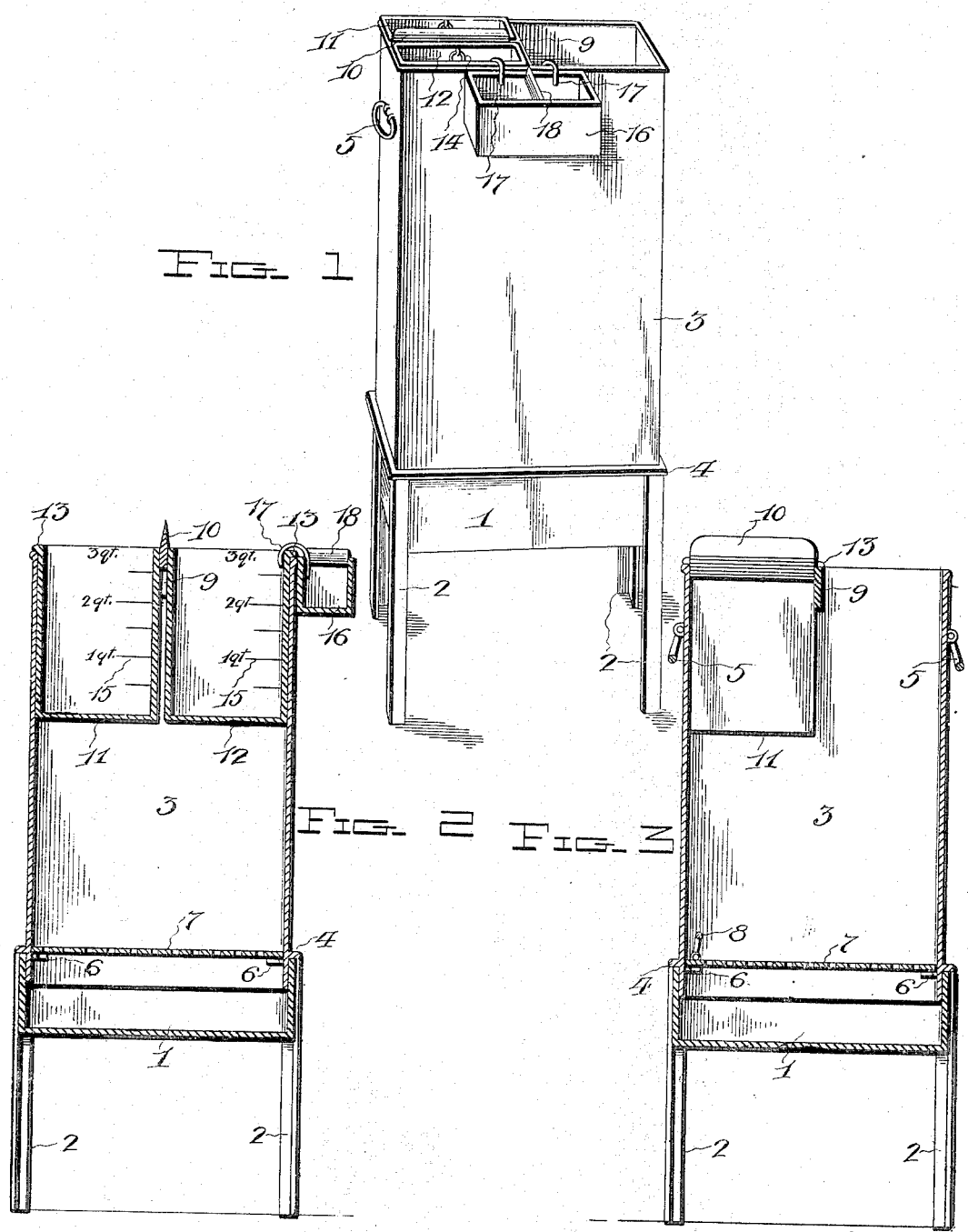

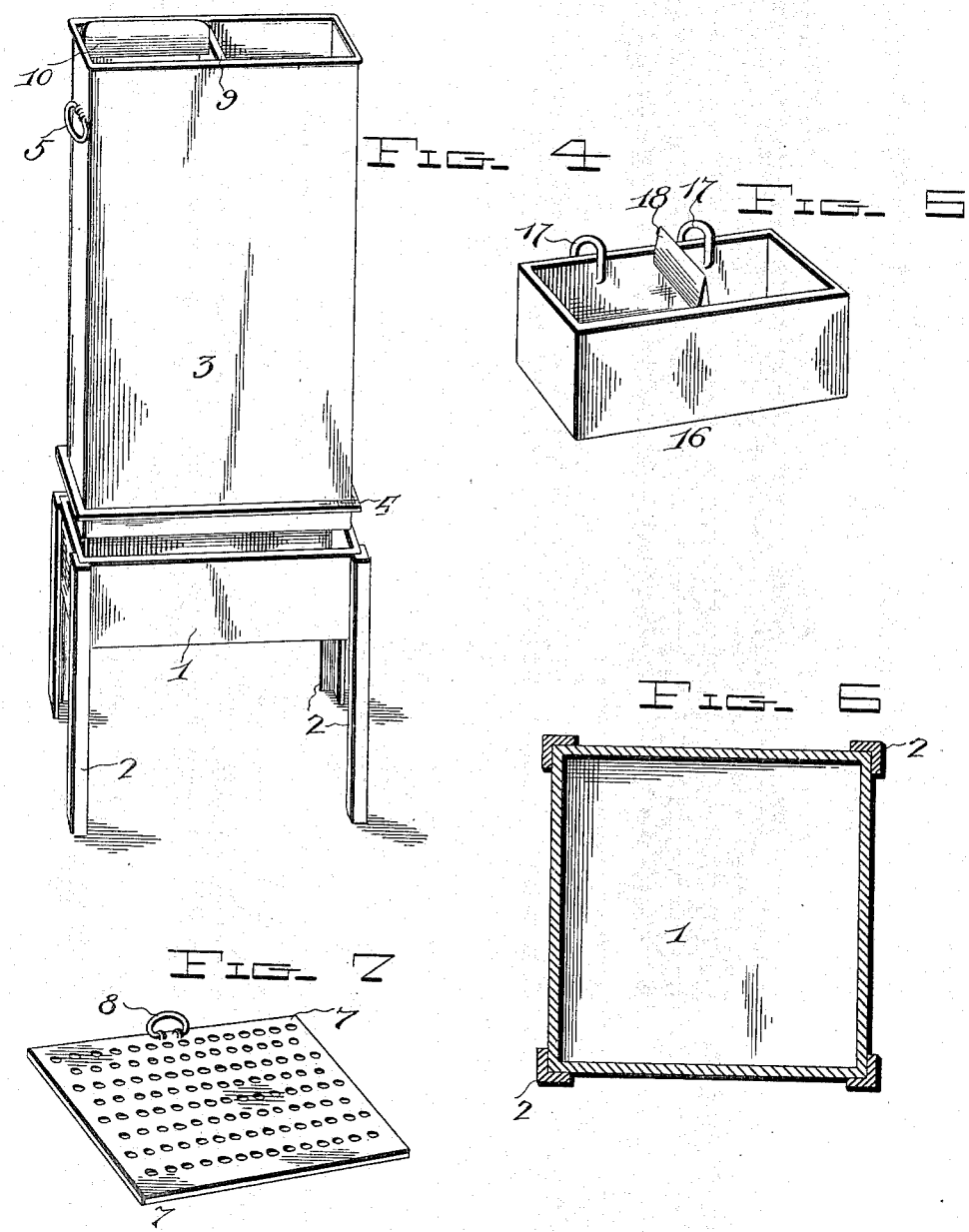

EMIL BRAUN, OF NEW YORK, N. Y.

EGG-SAVER.

SPECIFICATION forming part of Letters Patent No. 661,487, dated November 13, 1900.

Application filed August 4, 1899. Renewed April 26, 1900. Serial No. 14,503. (No model.)

*To all whom it may concern:*

Be it known that I, EMIL BRAUN, a citizen of the United States, residing at New York city, in the county of New York and State of New York, have invented certain new and useful Improvements in Egg-Savers; and I do declare the following to be a full, clear, and exact description of the invention, such as will enable others skilled in the art to which it appertains to make and use the same.

My invention relates to a device for bakers' use in breaking eggs for pastry and the like; and the object is to provide a simple, inexpensive, and convenient receptacle for breaking the eggs in an economical and expeditious manner, so that the operation may be rapidly performed and the entire contents of the eggs saved.

To this end the invention consists in the construction, combination, and arrangement of the several parts of the device, as will be hereinafter more fully described and particularly pointed out in the claim.

In the accompanying drawings the same reference characters indicate the same parts of the invention.

Figure 1 is a perspective view of my improved egg-receptacle. Fig. 2 is a vertical transverse section of the same. Fig. 3 is a similar view taken at right angles to Fig. 2. Fig. 4 is a perspective view showing the shell-holder raised above the base or drip-pan. Fig. 5 is a detail perspective view of the auxiliary receptacle, and Fig. 6 is a horizontal section through the drip-pan. Fig. 7 is a similar view of the removable perforated bottom.

1 denotes the base or drip pan supported on legs 2 2, which, being formed of angle-iron, also form vertical braces for the rectangular corners of the drip-pan.

3 denotes the shell-receptacle, which snugly fits the drip-pan, it being provided with a continuous horizontal flange 4, which rests upon the upper edge of the drip-pan to support the shell-holder in a vertical position. This holder is provided with a pair of external handles 5 5 for manipulating it, and near its end, on the inside corners, are four fixed brackets 6 6 to support the foraminous shelf 7, which is provided with a grip 8 to conveniently remove it during the cleansing operation.

9 denotes a cross-brace extending across the mouth of the shell-holder, and 10 denotes a cutting-blade extending from the center of said brace to the contiguous side of the holder, so that the cutting edge of the blade extends a short distance above the mouth of the holder.

11 and 12 denote counterpart egg-receptacles formed with an external projecting head or lip 13 and integral hinged grip-handles 14, and one of the walls of each egg-holder is provided with a vertical scale 15 to indicate the quantity of the contents of each vessel. These vessels 11 and 12 are supported in the shell-holder on either side of the cutting-blade, their beaded edges resting on the contiguous upper edge of the shell-holder and the edge of the cross-brace to suspend them in the position shown and with their open ends on a level with the mouth of the shell-holder.

16 denotes a smaller-sized auxiliary egg-holder provided with suspension-hooks 17 17 to detachably secure it to the outside of the shell-holder, and it is also provided with a cross-brace 18, the upper edge of which forms a cutter, as in the first instance.

The manner of using the device is as follows: The eggs from which it is desired to extract the contents are taken one at a time, and while held in a horizontal position are given a sharp blow on the cutter-blade 10, and the shell thus divided is then separated by hand and the contents dropped into either of the vessels 11 or 12 and the shells thrown into the shell-holder, where they fall upon the foraminous bottom, and any of the albuminous white portion remaining in the shell drips into the pan 1. Should it be desired to separate the whites from the yolks, the whites may be dropped in one of the egg-receptacles and the yolks in the other.

In using eggs the quality of which is uncertain they may be first broken over the auxiliary receptacle and those unfit for use are dropped into it, while the ones which may be used are treated as in the first instance.

The accompanying drawings show my invention in the best form now known to me;

but many changes in the details might be made within the skill of a good mechanic without departing from the spirit of my invention as set forth in the claim at the end of this specification.

Having thus fully described my invention, what I claim, and desire to secure by Letters Patent, is—

The drip-pan, the shell-holder removably supported thereon, a foraminous shelf removably suspended in said holder, a cutter-blade fixed to the upper end of said holder, and the egg-vessels suspended in the mouth of said holder on opposite sides of said cutter-blade, substantially as and for the purpose set forth.

In testimony whereof I have hereunto set my hand in presence of two subscribing witnesses.

EMIL BRAUN.

Witnesses:
 AUG. CHASON,
 GEO. W. FOSTER.